Feb. 12, 1924.

G. T. BISHOP ET AL 1,483,325

STERILIZING APPARATUS

Filed April 10, 1923   3 Sheets-Sheet 1

Inventor
G.T.Bishop,
W.R.Hagerman,

By

Attorney

Feb. 12, 1924.

G. T. BISHOP ET AL

STERILIZING APPARATUS

Filed April 10, 1923  3 Sheets-Sheet 3

1,483,325

Inventor
G. T. Bishop,
W. R. Hagerman,

By

Attorney

Patented Feb. 12, 1924.

1,483,325

UNITED STATES PATENT OFFICE.

GEORGE TOMAS BISHOP AND WILLARD RAY HAGERMAN, OF CHEHALIS, WASHINGTON.

STERILIZING APPARATUS.

Application filed April 10, 1923. Serial No. 631,142.

*To all whom it may concern:*

Be it known that we, GEORGE TOMAS BISHOP and WILLARD RAY HAGERMAN, citizens of the United States, and residents of Chehalis, in the county of Lewis and State of Washington, have invented certain new and useful Improvements in Sterilizing Apparatus, of which the following is a specification.

This invention relates to sterilizing apparatus especially adapted for use in the sterilization of milk contained in cans although of course adapted for use for other purposes.

One of the principal objects of the invention is to provide an apparatus of this character so organized and constructed as to enable a single operator to exercise a complete control over the agitation to which the cans are subjected during the process of sterilization, the cans and the milk contained therein being caused to remain stationary during the greater part of or for the entire process, or being subjected to partial or complete agitation, as found desirable, whereby when utilized for sterilizing milk in cans there is effected a thorough and complete sterilization without impairing the quality of the milk so as to produce a pure and wholesome product of rich color, substantial body and high food value, and wherein at the same time the apparatus has the capacity for speedily handling a relatively large number of cans so as to obtain all of the advantages of a continuous process while producing a superior product.

A further object is to provide an apparatus of this character wherein the loading operation is automatic, can operated means being provided for stopping the feed of the cans into the machine when the same has been loaded to its capacity, and wherein the unloading operation is semi-automatic, it being carried out automatically after several simple adjustments have been made exteriorly of the tank or machine.

Another object is to provide a device of this character which is of simple and durable construction, reliable and safe in operation and easy and comparatively inexpensive to manufacture.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1:
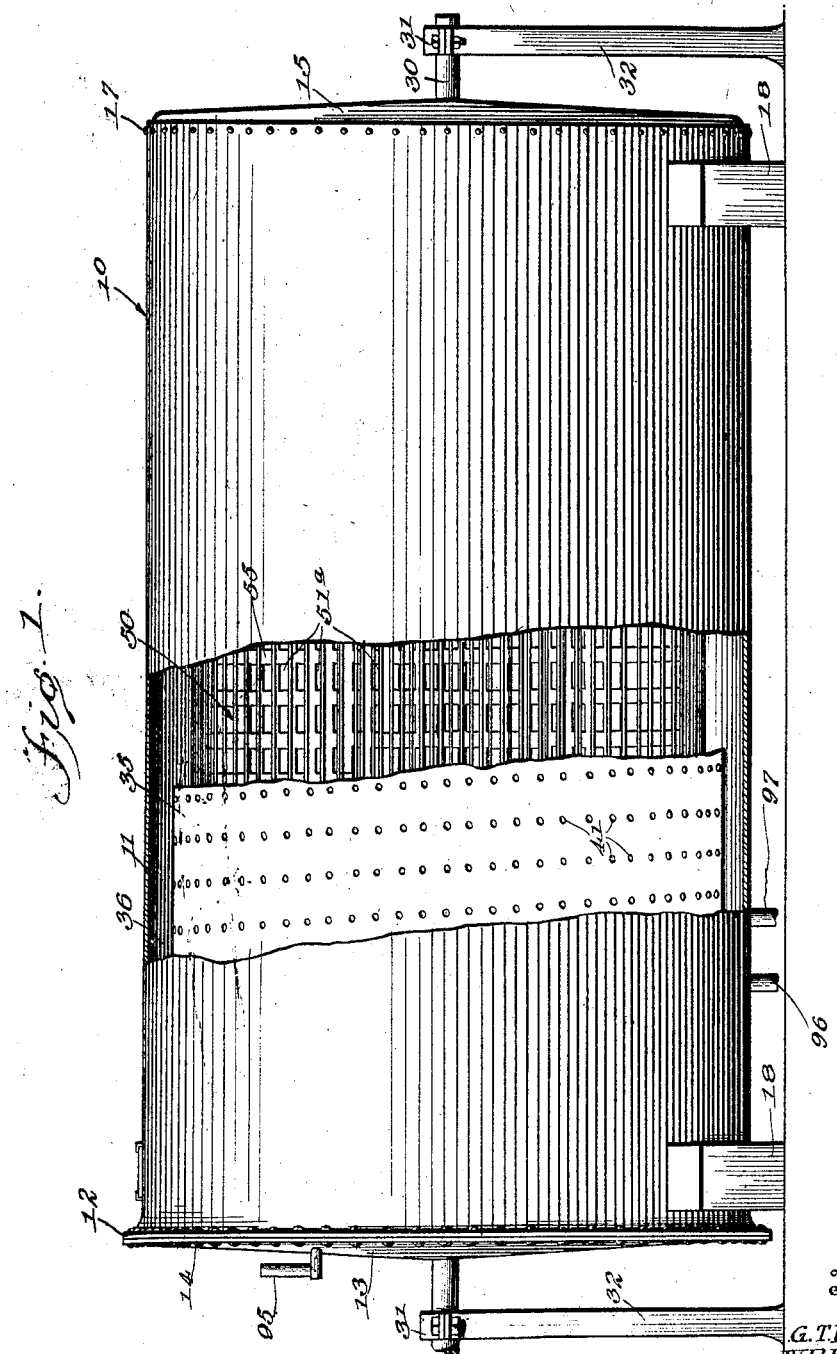
Figure 1 is a view in side elevation, showing the preferred embodiment of the invention, parts being broken away for the sake of illustration.

Referring to the drawings wherein for the sake of illustration is shown the preferred embodiment of the invention, the numeral 10 designates a steam tight drum in which the sterilization process is carried out, the drum comprising a cylindrical body portion 11 having one end flanged, as at 12. A head 13 is fitted against the flanged end 12 and is secured to the flanged end by means of bolts and nuts or rivets 14, a suitable packing being employed if found necessary to provide for a steam tight fit. The other end of the drum is closed by a head 15 having a flange 16 fitting in the end of the body portion and secured in position by means of bolts and nuts or rivets 17. Suitable packing may also be provided if found necessary between the head 15 or the flange thereof and the cylindrical body portion to provide a steam-tight fit. The drum 10 is supported in any suitable manner such for instance as by means of legs 18 resting on the foundation and secured to the body portion adjacent the ends thereof. The upper part of the drum adjacent the flanged end thereof is provided with an inlet opening 19 having a sliding door or closure 20 mounted for sliding movement in flanged guides 22 secured on the body portion of the drum and suitable packing may be provided to make this sliding door a steam-tight fit when closed. At the opposite end of the drum and on the lower side thereof and preferably diametrically opposite though longitudinally spaced from the inlet an outlet opening 25 is provided in the body portion of the drum and is also equipped with a sliding door 26 mounted in suitable guides 27 and having if necessary suitable packing to render the same steam tight in closed position.

A rotatable shaft 30 is journaled in suitable bearings 31 provided therefor in standards 22 arranged adjacent each end of the drum 10 and at the points where the shaft 30 extends through the heads of the drum it operates through a stuffing box, the stuffing boxes being designated at 33 and 34, respectively.

Within the drum 10 a cylindrical shell 35 is arranged, the shell 35 being somewhat smaller than the interior diameter of the drum so as to provide a space 36 between its outer periphery and the inner periphery of the drum and the shell being loosely mounted on the shaft 30 by means of circular end plates 37 secured to the shell and having bearings 37ª formed therein through which the shaft 30 extends and is loosely fitted. Thus while the shell 35 is supported on the shaft and preferably is constrained against longitudinal movement with respect thereto as by means of a collar or pin and slot or the like, it is free to rotate relatively of the shaft 30 or to remain stationary while the shaft rotates.

On the inner periphery of the shell 35 a spiral track 40 is provided and is made up of T-iron bolted or otherwise suitably secured to the inner wall of the shell. Between the convolutions of the T-iron making up the track the shell 35 is provided with series or rows of perforations 41 which provide for the circulation and distribution of the steam or other heating agent as will hereinafter more fully appear.

At the end of the shell 35 which is disposed adjacent to the head 13 an inlet 42 is formed and is adapted to be brought into registry with the inlet 19 of the drum. Also at the end of the shell adjacent the outlet 25 an outlet opening 43 is formed in the shell and of course it is adapted to be brought into registry with the outlet 25 from the drum. A sliding closure or door 44 is provided for the outlet 43 and is mounted in suitable guides 45 provided therefor in the shell. This closure and the associated parts which control the loading and unloading operation will be hereinafter more fully described.

A can carrier designated generally at 50 is mounted within the cylindrical shell 35 and includes a cylindrical body 51 mounted by means of spiders 52 on the shaft 30, the spiders including arms 53 fixed to the cylindrical body 52 and heads 54 keyed to the shaft 30. In the periphery of the cylindrical body of the can carrier longitudinal grooves or pockets 55 are formed. Along the center lines of the bases of the grooves or pockets and along the ridges defined between the grooves or pockets rods 56 are extended and are suitably secured in position. The relative size of the shell 35 and the can carrier 50 is such that the pockets 55 are adapted to receive the cans to be handled, the rods 56 providing smooth and easy bearings for these cans and enabling them to readily partake of their necessary movements through the pockets especially as the body 51 of the carrier is preferably provided with a multiplicity of openings 51ª to lessen its weight.

Figure 2:
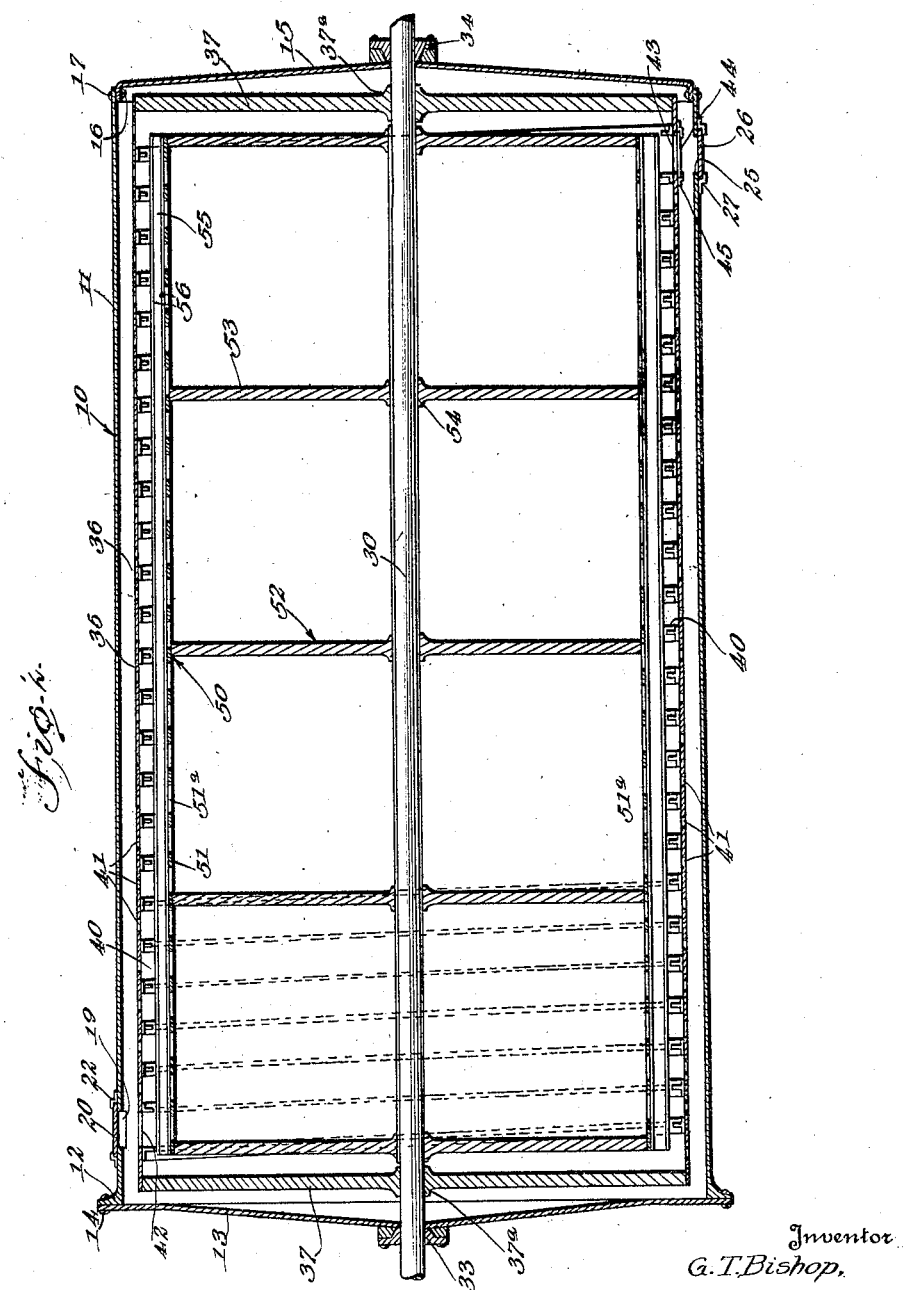
Figure 2 is a view in longitudinal vertical section.
Figure 3:
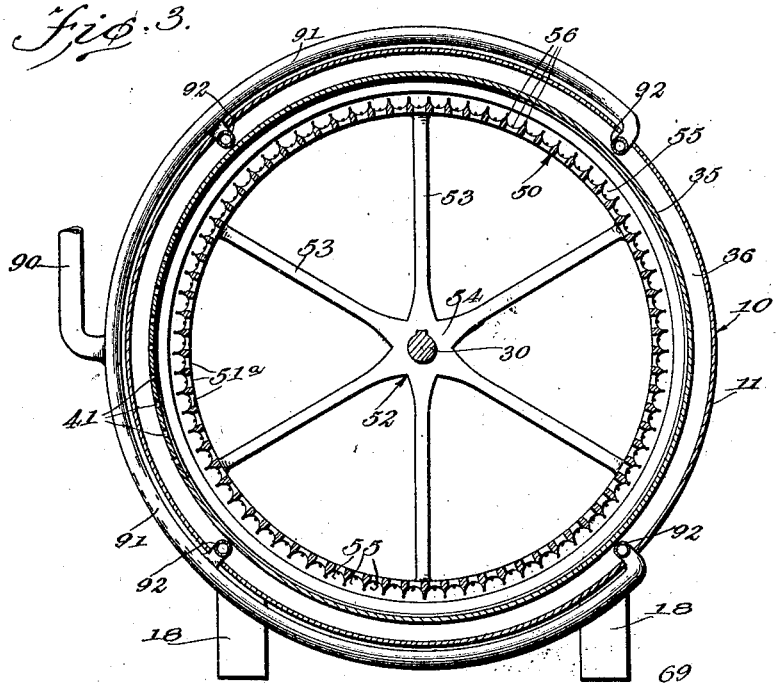
Figure 3 is a view in transverse vertical section.

With the arrangement thus far described when cans are fed into the drum through the inlet 19 from the usual endless carrier or chute employed, they will pass through the alined inlets 19 and 42 of the drum and shell into the underlying pocket 55 of the can carrier, as shown in Figure 2. At such time the shaft 30 is rotated by a motor or other suitable means and it is necessary to employ some means for holding the cylindrical shell carrying track stationary so that the cans will be advanced along into the pockets in which they are received by virtue of the coaction of the stationary spiral track and the relative rotary movement of the can carrier which carrying the cans with it causes them to advance along in the pockets 55 in which they are contained.

Figure 4:
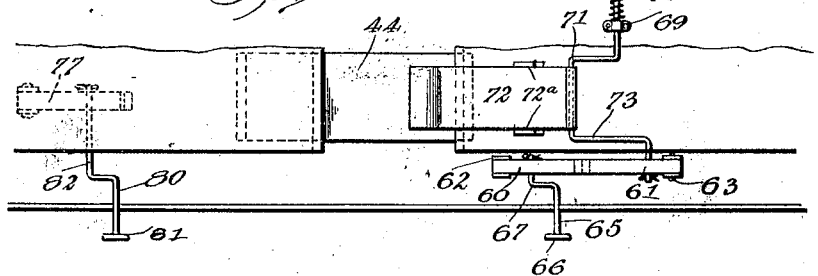
Figure 4 is a fragmentary view in vertical section, showing the mechanism employed for controlling the loading and unloading operations.
Figure 5:
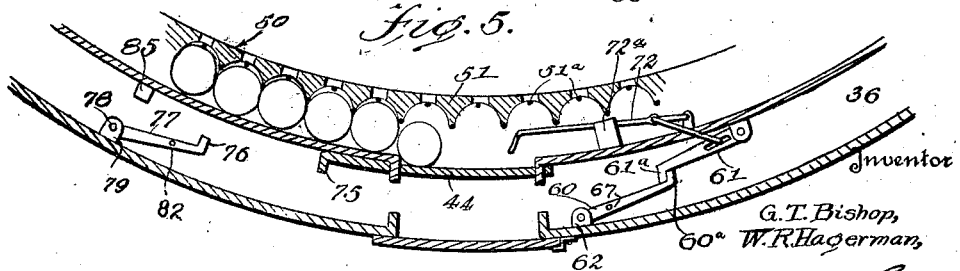
Figure 5 is a view in plan of the mechanism shown in Figure 4.

For this purpose there is employed as shown in Figures 4 and 5 a pair of interengaging or interlocking dogs or pawls 60 and 61, located near the exit end of the apparatus, the dogs 60 being pivotally mounted on a lug 62 integrally formed with or rigidly connected to the drum 10 and the dog 61 being pivotally connected to the lug 63 integrally formed with or rigidly connected to the shell 35 and the two dogs operating in the space 36 between the shell and the drum. As clearly shown in Figure 4 the dogs 60 and 61 are formed with hooked ends 60ª and 61ª which interengage when it is desired to hold the shell 35 stationary. The dog 60 is controlled as to its position and as to its engagement with the dog 61 by manually operable means adapted to be actuated exteriorly of the drum and such means may conveniently comprise a shaft 65 rotatably mounted in a suitably packed bearing provided therefor in the drum and having a hand wheel 66 on its outer end whereby it may be turned and a crank 67 on its inner end which is connected with the dog 60 by a pivotal or pin and slot connection. Obviously as the hand wheel is turned the dog 60 may be moved to position to engage the dog 61 or may be moved out of engagement with the dog 61 or to such position as not to be engageable with the dog 61 in any of its positions. For controlling the dog 61 a shaft 68 is rotatably mounted in bearings 69 provided therefor on the shell 35. The portion of the shaft comprehended between the bearings 69 has mounted thereon a torsional coil spring 70 one end of which is connected to the shaft and the other end of which is connected to the bearing or other stationary structure, the torsional coil spring being thereby adapted to turn the shaft in one direction. One end of the shaft projects beyond one end of the bearings 69 and is formed with a crank 71 having pivotally connected thereto a plate 72 operating between guides 72ª. Beyond the crank 71 a second crank 73 of opposite throw is formed on the shaft 68 and is connected by a lateral arm 74 with the dog 61, the arm being rigidly connected to the crank and having a pin and slot connection with the dog.

The sliding door or closure 44 for the outlet 43 of the shell 35 is provided with a lug 75 which is adapted to be engaged by the hooked end 76 of a pawl or dog 77 pivotally mounted, as at 78, on a lug 79 rigidly secured to the drum 10. As shown in Figure 4 the dog 77 may be controlled as to its engagement with the lug 75 by means of a shaft 80 journaled in a suitably packed bearing in the drum and having a hand wheel 81 on its outer end and having a crank 82 at its inner end, the crank having a slot or other suitable connection with the pawl or dog 75. A stop 85 in the form of a bar bolted to the shell 35 is provided and is adapted to be engaged by the bar as will be presently described.

Means is provided for supplying the steam or other heating or sterilizing medium into the drum 10 and preferably comprises a steam supply pipe 90 connected by branches 91 extending through the drum and suitable packing to distributing pipes 92 which extend longitudinally of the drum in the space 36 at desired angular intervals around the circumference thereof. In the arrangement shown four such pipes are provided but obviously the number may be increased or decreased as desired. Each pipe is perforated along its inner side that is along the portion that confronts the shell 35 and the steam issues from the perforations of the distributing pipe and flows through the perforations of the shell in and around the cans carried in the pockets of the can carrier. It is to be noted at this time that the rods 56 not only provide a smooth bearing for the cans but leave between the cans and the walls of the pockets spaces through which the steam may circulate to provide for a more uniform and thorough sterilization.

If desired a thermometer designated at 95 may be provided on the drum and it is also to be understood that there will be a counter located somewhere in the track which when the sterilizer has enough cans will automatically shut the same off so that the operator can switch to the next sterilizer.

Before carrying out the sterilization operation the sterilizer is charged with cans containing milk or other substances to be sterilized the door 44 is closed, the dogs 61 and 62 are engaged to lock the shell 35 to the drum and thus holds the same stationary and the dog 77 is retracted or so positioned as not to engage the lug or flange 75 in the door 44. The cans are then fed in through the inlets 19 and 42 and thus fall into the pocket 55 of the can carrier which underlies these inlets. As the can carrier is rotated the cans in the pockets thereof will be advanced along the carrier by virtue of the action of the spiral track 40 and this action will continue until the pockets 55 are completely filled, at which time the first can which has entered the drum will just roll up on the plate 72 and depress the plate which being connected to the crank 71 will turn the shaft 68 against the tension of its torsional coil spring 70. This movement of the shaft will be transmitted to the dog 61 through the crank 73 the outer end of which moves upwardly whereby the dog 61 will be disengaged from the dog 60. This will result in a release of the shell 35 and this shell will then be rotated with the carrier by virtue of the frictional engagement thereof with the cans of the carrier and in this manner the feeding of the cans onto the carrier will be arrested. The doors 20 and 26 are then closed so that the drum is steam tight and the steam supply valve provided in the steam supply pipe is opened to permit the steam to flow into the distributing pipes and to issue into the interior of the drum. The steam being distributed throughout the drum and being circulated by the cans effects a uniform and thorough sterilization. Moreover the agitation to which the cans is subjected is under the complete control of the operator, and if desirable as it usually is, the cans are permitted to remain stationary during the greater part of the time that sterilization is going on this may be done by stopping rotation of the shaft 30. It is particularly important that the agitation to which the cans is subjected during the sterilization be controllable as the cans must lie perfectly still during a greater part of the process if the milk is to have a proper body. It is to be understood in this connection that the process of sterilization effects the milk in three ways, in the first place it kills the bacteria, second it gives the milk color, and third it gives it a body or viscosity, if the agitation to which the milk is subjected can be controlled as it is in the present invention. After the sterilization has progressed to the desired extent the supply valves are closed and the steam condensed if desired by running water into the drum and then taking the same therefrom, valve controlled pipes 96 and 97 being employed for this purpose. The door 26 is then opened and the dog 77 is thrown inwardly by turning the hand lever 81 so as to be positioned to engage the lug 75 on the dog 44 and then as the shaft is rotated the shell will also be rotated and the dog 77 engaging the lug 75 will bring about the opening of the door 44. As soon as the door 44 is open the cans resting on the plate 72 will drop through the openings 43 and 25 and the plate 72 being released in this manner will permit the coil spring 70 to turn the shaft 68 and throw the dogs 61 into position to engage the dog 60, this dog 60 having been previously thrown back into the path of the dog 61 by suitably turning the hand wheel 66. The hooked ends of the dogs 60 and 61 being then interengaged the shell 35 is held stationary so as the shaft 30 continues to turn the can carrier will be turned with it and the cans then in the sterilizer will be advanced through the spiral track and out through the openings 43 and 25 which lie at the end of the spiral track. With this arrangement one operator can take care of the output of two filling machines now in use whereas at the present time six operators are required to take care of the system now in common use. Moreover should the sterilizer be built in forty or more case sizes no operator would be necessary as the processor could handle the milk from one filling machine very easily. The sterilizer also provides for a more even distribution of steam around the cans, giving a more even cook, and therefore a better product. This is true even at the center of the sterilizer so that even though the milk be of a sensitive nature, as it is some seasons of the year, the product is still of a high and uniform grade as each can is subject to the same conditions.

We claim:

1. In an apparatus of the character described, a drum, a rotatable shaft extending through the drum, a shell arranged in the drum and mounted on the shaft, the shell and the shaft being free to partake of relative rotation, a track carried by the shell interiorly thereof, a can carrier mounted on the shaft and keyed thereto and having pockets adapted to receive cans, the track of the shell being adapted to coact with the cans of the carrier to advance the same on the carrier, releasable interlocking means between the shell and the drum, and means for supplying a heating medium into the drum.

2. In an apparatus of the character described, a drum, a rotatable shaft extending through the drum, a shell arranged in the drum and mounted on the shaft, the shell and the shaft being free to partake of relative rotation, a track carried by the shell interiorly thereof, a can carrier mounted on the shaft and keyed thereto and having pockets adapted to receive cans, the track of the shell being adapted to coact with the cans of the carrier to advance the same on the carrier, interlocking means between the shell and the drum, can operated means for releasing the interlocking means, and means for supplying a heating medium into the drum.

3. In an apparatus of the character described, a drum, a rotatable shaft extending through the drum, a shell arranged in the drum and mounted on the shaft, the shell and the shaft being free to partake of relative rotation, a track carried by the shell interiorly thereof, a can carrier mounted on the shaft and keyed thereto and having pockets adapted to receive cans, the track of the shell being adapted to coact with the cans of the carrier to advance the same on the carrier, interlocking means between the shell and the drum, can operated means for releasing the interlocking means, manually operable means for setting the interlocking means, and means for supplying a heating medium into the drum.

4. In an apparatus of the character described, a drum, a rotatable track within the drum, a rotatable can carrier cooperable with the track, and releasable means for holding the track against rotation when desired.

5. In an apparatus of the character described, a drum, a rotatable shaft extending through the drum, a shell loosely mounted for rotation on the shaft within the drum, a spiral track carried by the interior of the shell, a can carrier mounted upon and constrained to rotate with the shaft and arranged within the shell, the can carrier having longitudinal pockets through which the cans are advanced by the action of the track, said drum and said shell having inlets and outlets, the track terminating at the outlet of the shell, interlocking means between the shell and the drum for holding the shell stationary and including a pair of dogs adapted to be interengaged, one dog being pivotally connected to the shell and the other pivotally connected to the drum, manually operable means for controlling the dog pivotally connected to the drum and can operated means for controlling the dog pivotally connected to the shell, and means for supplying a heating medium into the drum.

6. In an apparatus of the character described, a drum, a rotatable shaft extending through the drum, a shell loosely mounted for rotation on the shaft within the drum, a spiral track carried by the interior of the shell, a can carrier mounted upon and constrained to rotate with the shaft and arranged within the shell, the can carrier having longitudinal pockets through which the cans are advanced by the action of the track, said drum and said shell having inlets and outlets, the outlet of the shell being provided with a sliding door and adjustable means engageable with the door for opening the same by rotation of the shell and drum, the track terminating at the outlet of the shell, interlocking means between the shell and the drum for holding the shell stationary and including a pair of dogs adapted to be interengaged, one dog being pivotally connected to the shell and the other pivotally connected to the drum, manually operable means for controlling the dog pivotally connected to the drum and can operated means for controlling the dog pivotally connected to the shell, and means for supplying a heating medium into the drum.

7. In an apparatus of the character described, a drum, a shaft rotatably mounted on the drum, a cylindrical shell loosely mounted on the shaft, a spiral track carried by the interior of the shell, the shell being provided with series of perforations between the convolutions of the track, a can carrier including a cylindrical body portion arranged within the shell, the cylindrical body portion being provided with longitudinally extending grooves and having rods extending along the faces of the grooves, and intermediate the grooves to provide bearings for the cans and spaces for the circulation of the steam, means for mounting the cylindrical body on the shaft, and means for supplying steam into the drum.

8. In an apparatus of the character described, a drum, a shaft extending through and rotatably mounted in the drum, a shell loosely mounted on the shaft, a track carried by the shell, a can carrier keyed to the shaft and arranged within the shell and having pockets in which the cans are received, means for holding the shell stationary during the loading of the can carrier, and can operated means for releasing said last mentioned means when the loading operation has been completed and comprising a pivot plate arranged at the end of the track and adapted to be engaged by a can.

9. In an apparatus of the character described, a drum, a shaft extending through and rotatably mounted in the drum, a shell loosely mounted on the shaft, a track carried by the shell, a can carrier keyed to the shaft and arranged within the shell and having pockets in which the cans are received, means for holding the shell stationary during the loading of the can carrier, and can operated means for releasing said last mentioned means when the loading operation has been completed.

WILLARD RAY HAGERMAN.
GEORGE TOMAS BISHOP.